(12) United States Patent
Green

(10) Patent No.: US 9,268,363 B2
(45) Date of Patent: Feb. 23, 2016

(54) CASE FOR A TABLET COMPUTING DEVICE

(71) Applicant: Andrew Bradford Green, Mt. Pleasant, SC (US)

(72) Inventor: Andrew Bradford Green, Mt. Pleasant, SC (US)

(*) Notice: Subject to any disclaimer, the term of this patent is extended or adjusted under 35 U.S.C. 154(b) by 0 days.

(21) Appl. No.: 14/302,914

(22) Filed: Jun. 12, 2014

(65) Prior Publication Data
US 2014/0370944 A1     Dec. 18, 2014

Related U.S. Application Data

(60) Provisional application No. 61/834,021, filed on Jun. 12, 2013.

(51) Int. Cl.
*H05K 5/02* (2006.01)
*B65D 85/00* (2006.01)
*G06F 1/16* (2006.01)

(52) U.S. Cl.
CPC ............ *G06F 1/1626* (2013.01); *G06F 1/1615* (2013.01)

(58) Field of Classification Search
USPC ................ 248/460; 206/701, 775; 455/575.1, 455/575.8
See application file for complete search history.

(56) References Cited

U.S. PATENT DOCUMENTS

| 8,708,140 B2* | 4/2014 | Liu | A45C 11/00 206/320 |
| 2011/0297564 A1* | 12/2011 | Kim | A45C 11/00 206/320 |
| 2012/0037285 A1* | 2/2012 | Diebel | A45C 11/00 150/165 |
| 2012/0043247 A1* | 2/2012 | Westrup | A45C 3/02 206/472 |
| 2012/0153116 A1* | 6/2012 | Harrison | A47B 23/044 248/460 |
| 2013/0001107 A1* | 1/2013 | Armstrong | A45F 5/00 206/216 |
| 2013/0264241 A1* | 10/2013 | McCosh | G06F 1/166 206/472 |

* cited by examiner

*Primary Examiner* — Blane J Jackson
(74) *Attorney, Agent, or Firm* — Wayne Edward Ramage; Baker Dowelson

(57) ABSTRACT

A case or device for holding and camouflaging a tablet computing device, such as an iPad or iPad2 tablet. The case protects the tablet computing device, and allows use of the tablet computing device without being removed. The case has several built-in stands with adjustable variable viewing angles. The exterior of the case is camouflaged in appearance.

10 Claims, 10 Drawing Sheets

CASE FOR A TABLET COMPUTING DEVICE

This application claims benefit of and priority to U.S. Provisional Application No. 61/834,021, filed Jun. 12, 2013, by Andrew B. Green, and is entitled to that filing date for priority. The specification, figures and complete disclosure of U.S. Provisional Application No. 61/834,021 are incorporated herein by specific reference for all purposes.

FIELD OF INVENTION

This invention relates generally to a case or holder for portable electronic devices and tablet computing devices.

BACKGROUND OF THE INVENTION

The proliferation of portable electronic devices and tablet computing devices is well known. Each successive iteration or generation provides increasingly greater features and capabilities, typically through a variety of user-friendly, content-specification applications (or "apps"). One market segment that has shown exemplary growth are tablet computing devices, which continue to impact the way people manage business, interact with each other, and conduct their daily lives.

Because these devices are intended to be portable and carried by the user, they are susceptible to damage from being dropped or hit. While some damage may be superficial or cosmetic, other damage may impair the functioning of the device (e.g., fractured screen or lens).

A variety of protective cases are known in the art for encasing and protect portable electronic devices from possible damage, particularly in the case of cell phones or smart phones. While some cases are known for use with tablet computing devices, such as those disclosed in U.S. Pat. Nos. 8,312,991 and 8,328,991, which are incorporated herein by specific reference for all purposes, these cases do not always allow complete access to all functions and capabilities of the device while presenting an aesthetically pleasing and protective appearance. Accordingly, there is a need for cases for tablet computing devices that will protect the device while allowing full functionality and use of the device with an aesthetically pleasing and protective appearance.

SUMMARY OF INVENTION

In various exemplary embodiments, the present invention comprises a device for holding and camouflaging a tablet computing device, such as an iPad or iPad2 tablet. The device comprises a front cover and a back cover, which may be rigid or hardback. The corners of either or both covers may be reinforced for protection from impacts. The front and back covers are hingedly connected along one edge by a spine. In one embodiment, the spine is rigid to provide additional protection to the tablet computing device. The exterior of the covers and spine may be made of any suitable material, including, but not limited to, leather, simulated leather, cardboard, plastic, or the like.

The front and back covers may be closed in book fashion and secured. In one exemplary embodiment, the edges of the front and back covers (not including the spine) may be zippered together. In one embodiment, dual zippers are provided. This allows the user to unzip the device along one end just enough to connect a power cord, headphone cable, or the like, without having to unzip the other end.

The interior of the device comprises an interior support frame that securely holds the tablet computing device around its perimeter. The front of the interior support frame is open to provide access to the tablet computing device screen and controls. The back of the interior support frame may be open in whole or in part, and at a minimum, provides openings for any camera lens, power ports, speakers headphone connections, or controls on the back or sides of the tablet computing device.

In one exemplary embodiment, the interior support frame is hingedly attached to the edge of the back cover opposite the spine. The back of the interior support frame may comprise fastening means, such as snaps or Velcro, positioned near the spine. A pair of snaps on the back of the interior support frame are used to secure the interior support frame to the back cover.

In one embodiment, the tablet computing device is inserted into the interior support frame through a slot or opening behind the hinge attachment. In another embodiment, an attached flap may be tucked over the tablet computing device and into the slot or opening to help secure the tablet computing device. In yet another alternative embodiment, the tablet computing device is inserted into the front of the interior support frame, which may be made of stretchable material.

When unsnapped or unsecured from the back cover, the tablet computing device may be held up while still held securely in the interior support frame. This allows the user to use the tablet computing device to take pictures or operate similar functions.

The device may be used in two or three different typing or viewing configurations. In the typing configuration, the user folds the front cover underneath the back cover so the inside of the front cover is flat on the table or supporting surface, pulls up the interior support frame to allow access to a built-in typing stand under the interior support frame, folds out the bottom of the typing stand, and lowers the interior support frame until supported by the typing stand (the bottom edge of the typing stand may be stopped and secured by an interior edge of the back cover, the snaps on the back cover, Velcro, other similar fasteners). This presents the tablet computing device at a convenient angle for typing on the tablet computing device (such as when typing emails, writing a document, and the like). In another embodiment, the typing stand can be folded to two or more heights, allowing the tablet computing device to be positioned at different angles. In another embodiment, the typing stand can be removed and replaced by the user.

The device also may be used in a variable angle display-stand configuration. The outside of the back cover is placed flat on the table or supporting surface, and the side of the interior support frame closest to the spine is pulled up to the desired viewing angle. The front cover is then placed behind the interior support frame to support the interior support frame at a plurality of viewing angles. The edge of the front cover may be secured in place by a series of tabs, slots or folds on the back of the interior support frame for the desired viewing angle. In one embodiment, the device provides approximately 30 degrees of angle adjustment.

In yet another embodiment, the face of the front cover is placed flat on the table or supporting surface, and the side of the interior support frame closest to the spine is pulled out to the desired viewing angle, and held in place by friction with the interior of the front cover, or by other means known in the art.

In various exemplary embodiments, some or all of the interior of the front cover is covered by a dark colored (e.g., black, blue, dark gray, dark green, or other similar color) soft covering, such as suede leather, suede fabric, other fabric or cloth, foam padding, or the like. This covering may also extend to the interior of the back cover. The soft interior covering protects the tablet computing device's finish and screen, while the dark color enhances the tablet display without distracting the eyes.

In several exemplary embodiments, the exterior of the device has the appearance of a book, such as an old or vintage book. The exterior may have a distressed finish. When closed, the device thus appears to be an old or vintage book, disguising the fact that a tablet computing device is contained inside. This reduces the risk of theft.

DETAILED DESCRIPTION OF EXEMPLARY EMBODIMENTS

Figure 1:
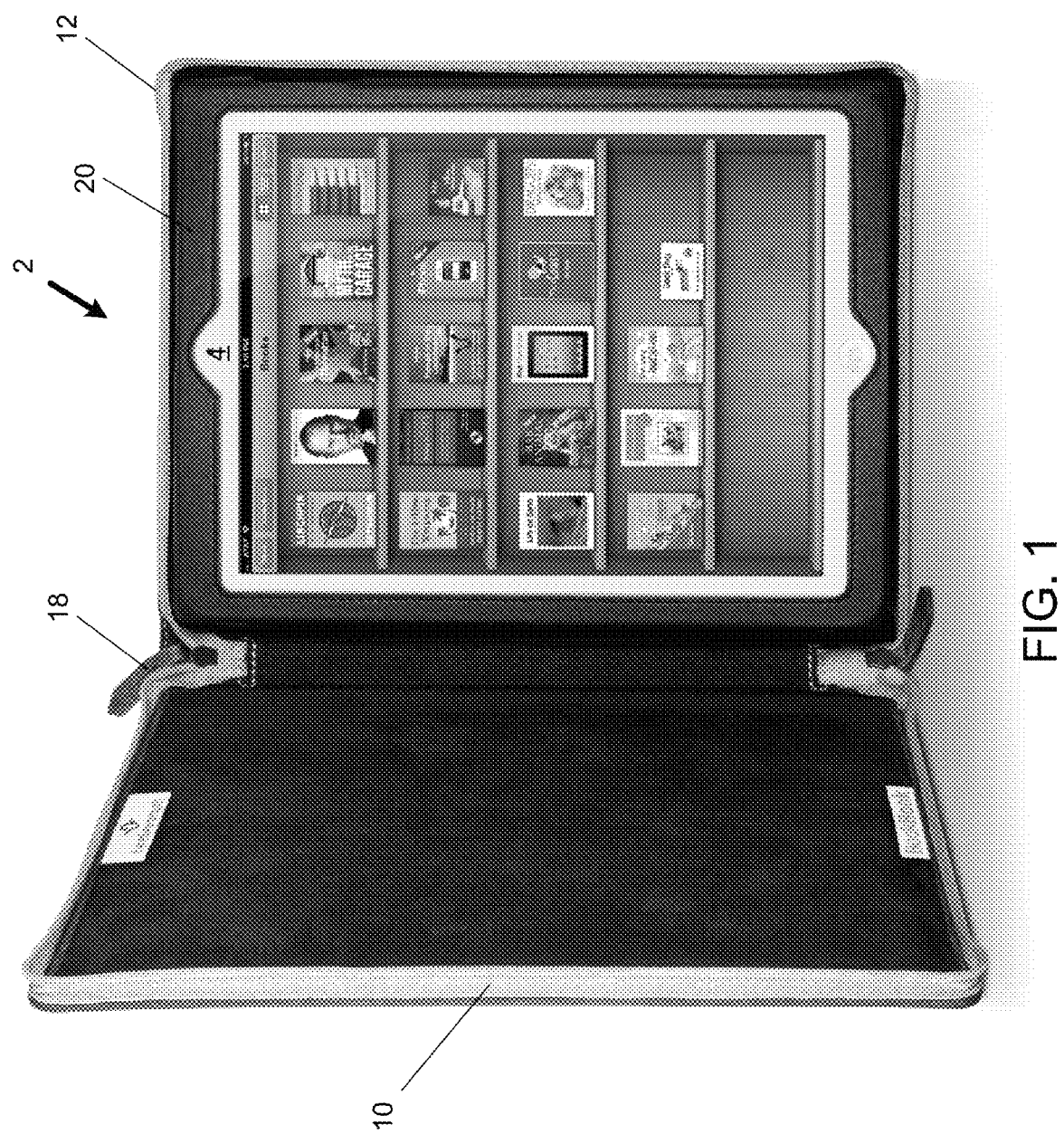
FIG. 1 shows a front view of an embodiment of the present invention in an open position.
Figure 2:
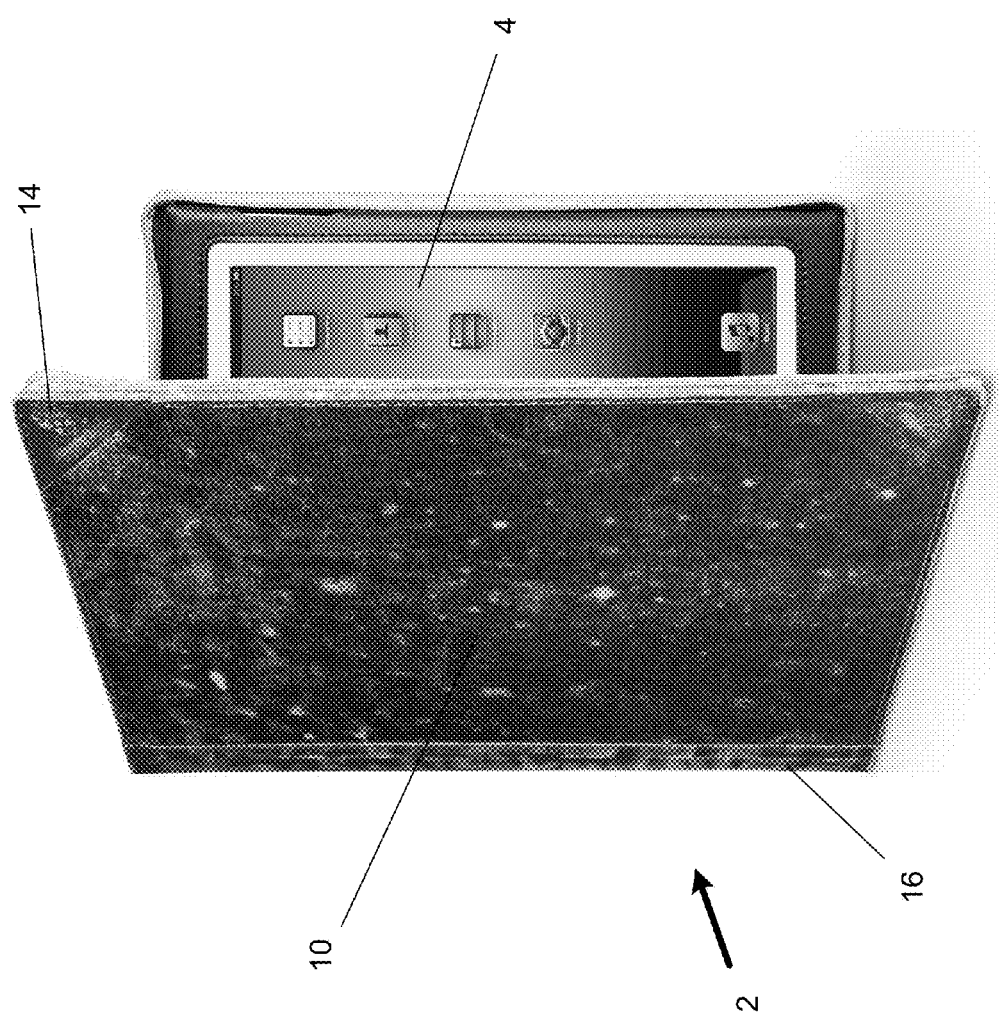
FIG. 2 shows the invention of FIG. 1 in a partially closed position.

In various exemplary embodiments, as described herein, and as seen in FIGS. 1-4, the present invention comprises a device 2 for holding and camouflaging a tablet computing device 4, such as an iPad or iPad2 tablet, or mini-tablet. The device comprises a front cover 10 and a back cover 12, which may be rigid or hardback. The corners 14 of either or both covers may be reinforced for protection from impacts. The front and back covers are hingedly connected along one edge by a spine 16. In one embodiment, the spine is rigid to provide additional protection to the tablet computing device. The exterior of the covers 10, 12 and spine 16 may be made of any suitable material, including, but not limited to, leather, simulated leather, cardboard, plastic, or the like.

The front and back covers may be closed in book fashion and secured. In one exemplary embodiment, the edges of the front and back covers (not including the spine) may be zippered together. In one embodiment, dual zippers 18 are provided. This allows the user to unzip the device along one end just enough to connect a power cord, headphone cable, or the like, without having to unzip the other end.

The interior of the device comprises an interior support frame 20 that securely holds the tablet computing device around its perimeter. The front of the interior support frame is open to provide access to the tablet computing device screen and controls. The back of the interior support frame may be open in whole or in part, and at a minimum, provides openings 22 for any camera lens, power ports, speakers and headphone connections, or other controls or ports on the back or sides of the tablet computing device.

In one exemplary embodiment, the interior support frame is hingedly attached 24 to the edge of the back cover opposite the spine. The back of the interior support frame may comprise fastening means, such as snaps or hook-and-loop fasteners, positioned near the spine. In the embodiment shown in FIGS. 3 and 4, a pair of snaps 26a, 26b on the back of the interior support frame are used to secure the interior support frame to the back cover to corresponding snaps 27a, 27b.

Figure 3:
FIG. 3 shows back of the interior support frame with typing stand.
Figure 4:
FIG. 4 shows the inside of the back cover.

In the embodiment shown in FIG. 3, the tablet computing device is inserted into the interior support frame through a slot or opening 28 behind the hinge attachment 24. In one embodiment, an attached flap 30 may be tucked over the tablet computing device and into the slot or opening to help secure the tablet computing device. In an alternative embodiment, the tablet computing device is inserted into the front of the interior support frame, which may be made of stretchable material.

Figure 5:
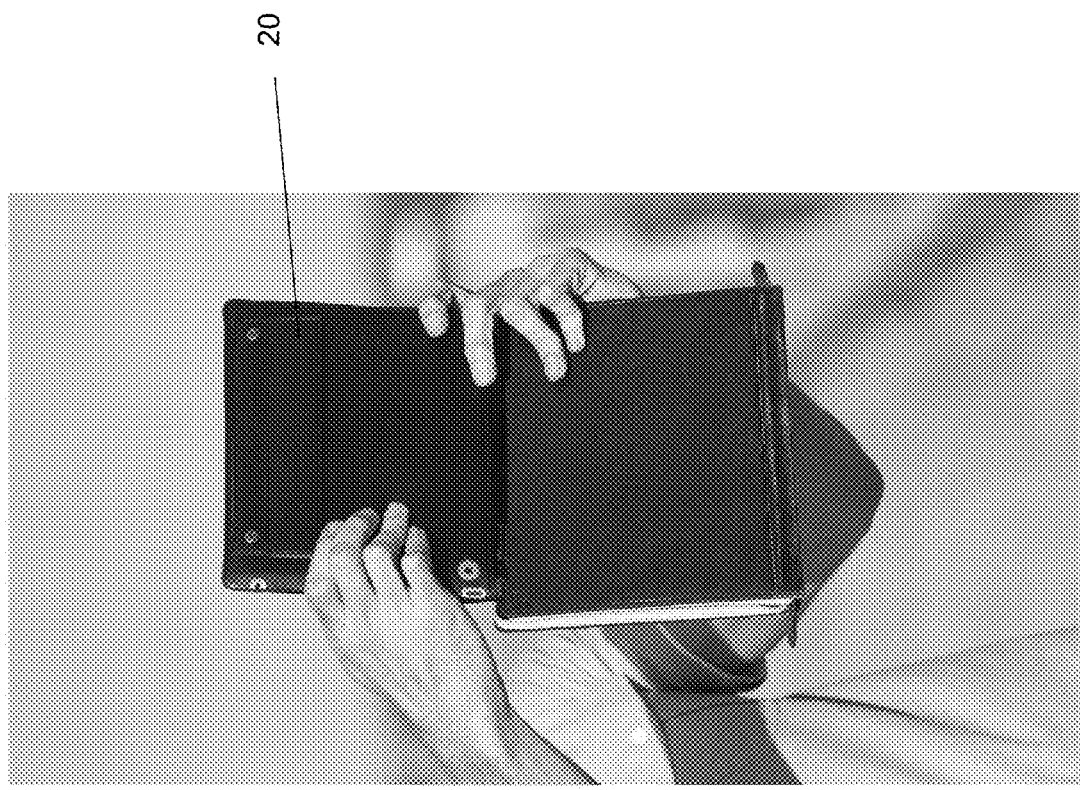
FIG. 5 shows the invention in an open photo-taking configuration.

When unsnapped or unsecured from the back cover, the tablet computing device may be held up while still held securely in the interior support frame 20, as seen in FIG. 5. This allows the user to use the tablet computing device to take pictures or operate similar functions.

Figure 6:
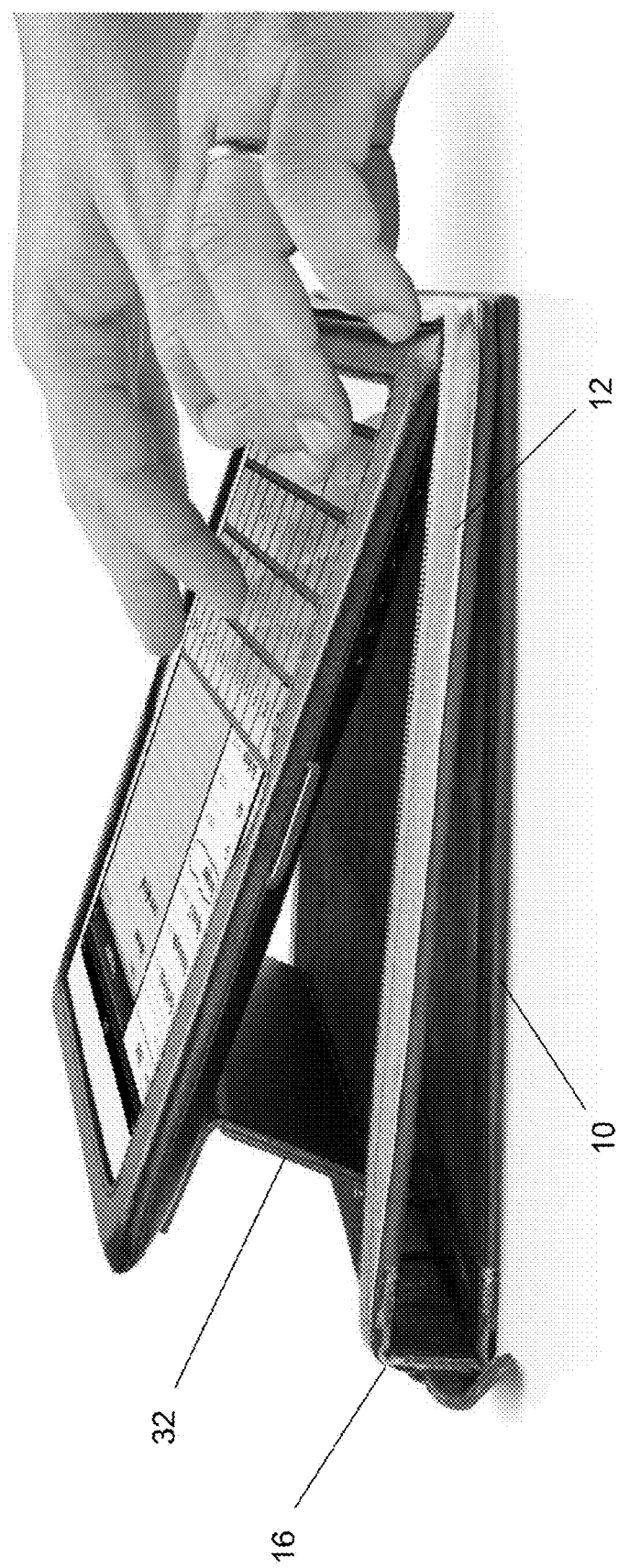
FIG. 6 shows the invention in a typing stand configuration.

The device may be used in two or three different typing or viewing configurations. In the typing configuration, as seen in FIG. 6, the user folds the front cover 10 underneath the back cover 12 so the inside of the front cover is flat on the table or supporting surface, pulls up the interior support frame 20 to allow access to a built-in typing stand 32 under the interior support frame, folds out the bottom of the typing stand 32, and lowers the interior support frame 20 until supported by the typing stand 32 (the bottom edge of the typing stand may be stopped and secured by an interior edge of the back cover, the snaps on the back cover, Velcro, other similar fasteners). This presents the tablet computing device at a convenient angle for typing on the tablet computing device (such as when typing emails, writing a document, and the like). In another embodiment, the typing stand 32 can be folded to two or more heights, allowing the tablet computing device to be positioned at different angles. In another embodiment, the typing stand 32 can be removed and replaced by the user.

Figure 7:
FIG. 7 shows in the invention in a display stand configuration.
Figure 8:
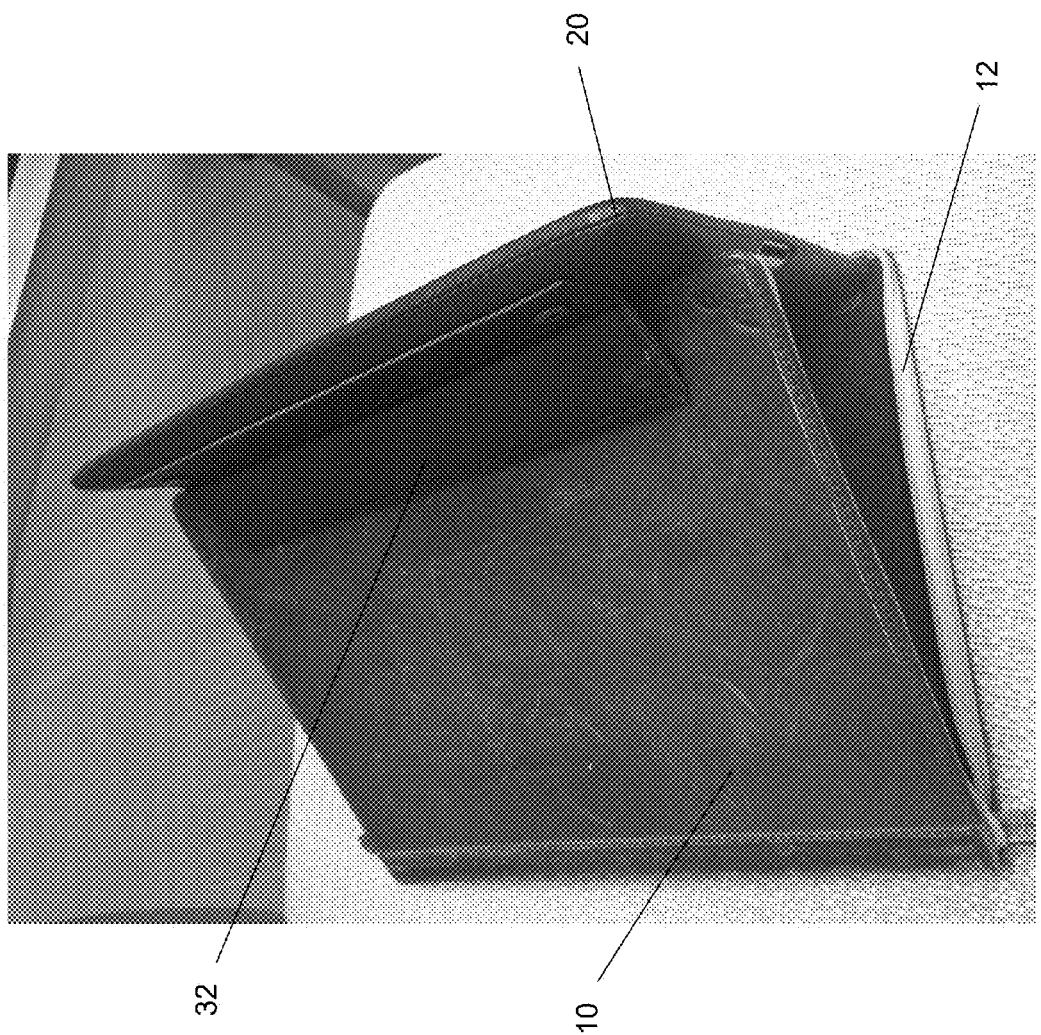
FIG. 8 shows the rear view of the invention in a display stand configuration.

The device also may be used in a variable angle display-stand configuration. As seen in FIGS. 7-8, the outside of the back cover 12 is placed flat on the table or supporting surface, and the side of the interior support frame 20 closest to the spine is pulled up to the desired viewing angle. The front cover 10 is then placed behind the interior support frame to support the interior support frame at a plurality of viewing angles. The edge of the front cover may be secured in place by a series of tabs, slots or folds, including but not limited to the typing stand 32, on the back of the interior support frame for the desired viewing angle. In one embodiment, the device provides approximately 30 degrees of angle adjustment.

In yet another embodiment, the face of the front cover 10 is placed flat on the table or supporting surface, and the side of the interior support frame 20 closest to the spine is pulled out to the desired viewing angle, and held in place by friction with the interior of the front cover, the zipper or zipper flap, or by other means known in the art.

In various exemplary embodiments, as seen in FIG. 1, some or all of the interior of the front cover is covered by a dark colored (e.g., black, blue, dark gray, dark green, or other similar color) soft covering, such as suede leather, suede fabric, other fabric or cloth, foam padding, or the like. This covering may also extend to the interior of the back cover. The soft interior covering protects the tablet computing device's finish and screen, while the dark color enhances the tablet display without distracting the eyes.

Figure 9:
FIGS. 9 and 10 show the disguised exterior of several embodiments of the invention.
Figure 10:
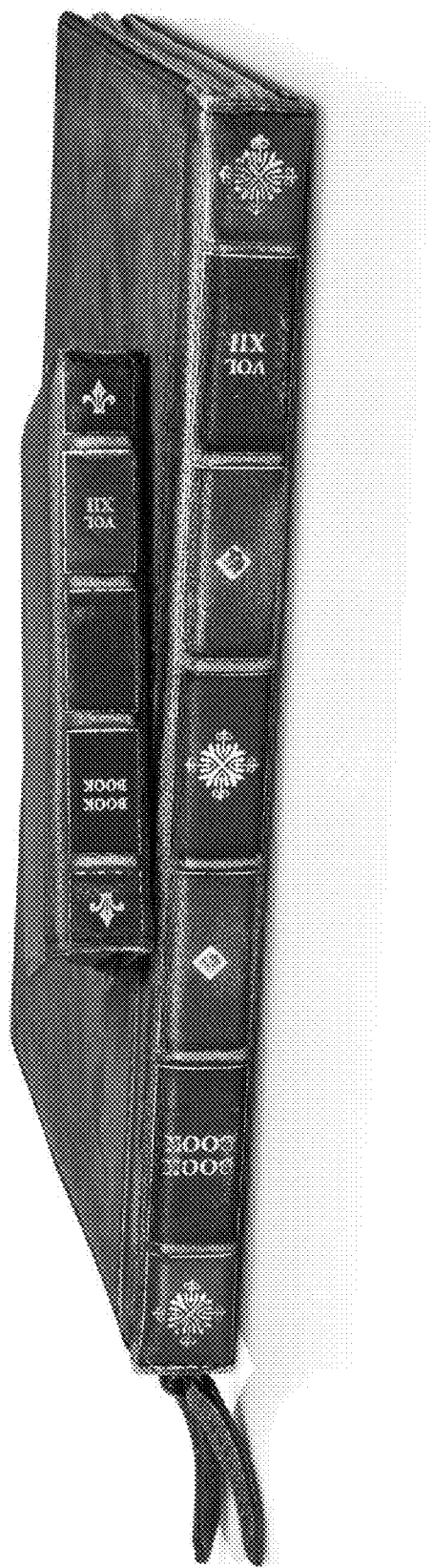

In several exemplary embodiments, the exterior of the device has the appearance of a book, such as an old or vintage book, as seen in FIGS. 9 and 10. The exterior may have a distressed finish. When closed, the device thus appears to be an old or vintage book, disguising the fact that a tablet computing device is contained inside. This reduces the risk of theft.

In one exemplary embodiment, the device is approximately 8.1 inches wide, 10.3 inches long, 0.86 to 1 inch in depth, and weighs approximately 11.6 ounces.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A case for a tablet computing device, comprising:
   a front cover with a right edge, a left edge, an exterior side and an interior side;
   a back cover with a right edge, a left edge, an exterior side and an interior side, said back cover being hingedly connected to said front cover along the left edge of the front cover and back cover;
   an interior support frame with a right edge, a left edge, a front side, and a back side, said interior support frame hingedly connected along its right edge to the interior side of the back cover along the right edge of the back cover, said interior support frame adapted to hold the tablet computing device in the case; and
   a folding typing stand hingedly attached to the back side of the interior support frame;
   wherein the case can be folded into a typing stand position by folding the front cover under the back cover, and unfolding the folding typing stand to elevate the left edge of the interior support frame;
   further wherein the case can be folded into a first variable angle display-stand position by elevating the left edge of the interior support frame, and placing the right edge of the front cover into contact with the back side of the interior support frame to support the interior support frame at the desired viewing angle.

2. The case of claim 1, further comprising means for removably fastening the back left side of the interior support frame to the interior side of the back cover.

3. The case of claim 2, wherein the fastening means comprises snaps.

4. The case of claim 1, wherein the interior support frame comprises a slot or opening on the back right side of the interior support frame for inserting the table computing device.

5. The case of claim 1, wherein the interior side of the front cover comprises a dark covering material.

6. The case of claim 1, wherein the interior side of the back cover comprises a dark covering material.

7. The case of claim 1, wherein the exterior of the case has the appearance of a book.

8. The case of claim 1, further comprising a zipper extending along the edges of the front and back covers to hold the front and back covers together.

9. The case of claim 1, further wherein the case can be folded into a second variable angle display-stand position by laying the front cover flat and placing the left side of the interior support frame in contact with the interior side of the front cover, whereby the right side of the interior support frame is elevated and supported by the back cover.

10. The case of claim 1, wherein the front and back covers are rectangular and rigid.

\* \* \* \* \*